US009608917B1

(12) United States Patent
Anderson et al.

(10) Patent No.: US 9,608,917 B1
(45) Date of Patent: Mar. 28, 2017

(54) SYSTEMS AND METHODS FOR ACHIEVING HIGH NETWORK LINK UTILIZATION

(71) Applicant: Google Inc., Mountain View, CA (US)

(72) Inventors: Glen Anderson, Mountain View, CA (US); Steven Padgett, Mountain View, CA (US); Junlan Zhou, Mountain View, CA (US); Uday Ramakrishna Naik, Mountain View, CA (US); Alok Kumar, Fremont, CA (US); Amin Vahdat, Los Altos, CA (US); Sushant Jain, Mountain View, CA (US)

(73) Assignee: Google Inc., Mountain View, CA (US)

( * ) Notice: Subject to any disclaimer, the term of this patent is extended or adjusted under 35 U.S.C. 154(b) by 450 days.

(21) Appl. No.: 14/058,749

(22) Filed: Oct. 21, 2013

(51) Int. Cl.
*H04L 12/851* (2013.01)
*H04L 12/801* (2013.01)

(52) U.S. Cl.
CPC .......... *H04L 47/2441* (2013.01); *H04L 47/10* (2013.01); *H04L 47/24* (2013.01)

(58) Field of Classification Search
CPC ...... H04L 47/2441; H04L 47/10; H04L 47/24
See application file for complete search history.

(56) References Cited

U.S. PATENT DOCUMENTS

| | | | | |
|---|---|---|---|---|
| 2002/0087713 A1* | 7/2002 | Cunningham | ........ | H04L 12/462 709/235 |
| 2003/0072264 A1* | 4/2003 | Mo | ...................... | H04L 43/0876 370/235 |
| 2005/0055708 A1* | 3/2005 | Gould | ..................... | H04N 7/163 725/25 |
| 2010/0202287 A1* | 8/2010 | Diaz | ....................... | H04L 47/10 370/230 |
| 2011/0231685 A1* | 9/2011 | Huang | ................... | G06F 1/3203 713/321 |
| 2012/0185433 A1* | 7/2012 | Harris, Jr. | ........... | G06F 11/2074 707/623 |

* cited by examiner

*Primary Examiner* — Walter Divito
(74) *Attorney, Agent, or Firm* — McDermott Will & Emery LLP

(57) ABSTRACT

Systems and methods for achieving high utilization of a network link are provided. A first communication protocol can be selected for transmitting network flows of a first type. A first quality of service can be assigned to network flows of the first type. A second communication protocol can be selected for transmitting network flows of a second type. A second quality of service, lower than the first quality of service, can be assigned to network flows of the second type. A first percentage of available bandwidth can be allocated to the network flows of both the first and second types. The remaining bandwidth, plus a second percentage of available bandwidth, can be allocated to the network flows of the second type, such that the total allocated bandwidth exceeds the available bandwidth of the network link.

17 Claims, 9 Drawing Sheets

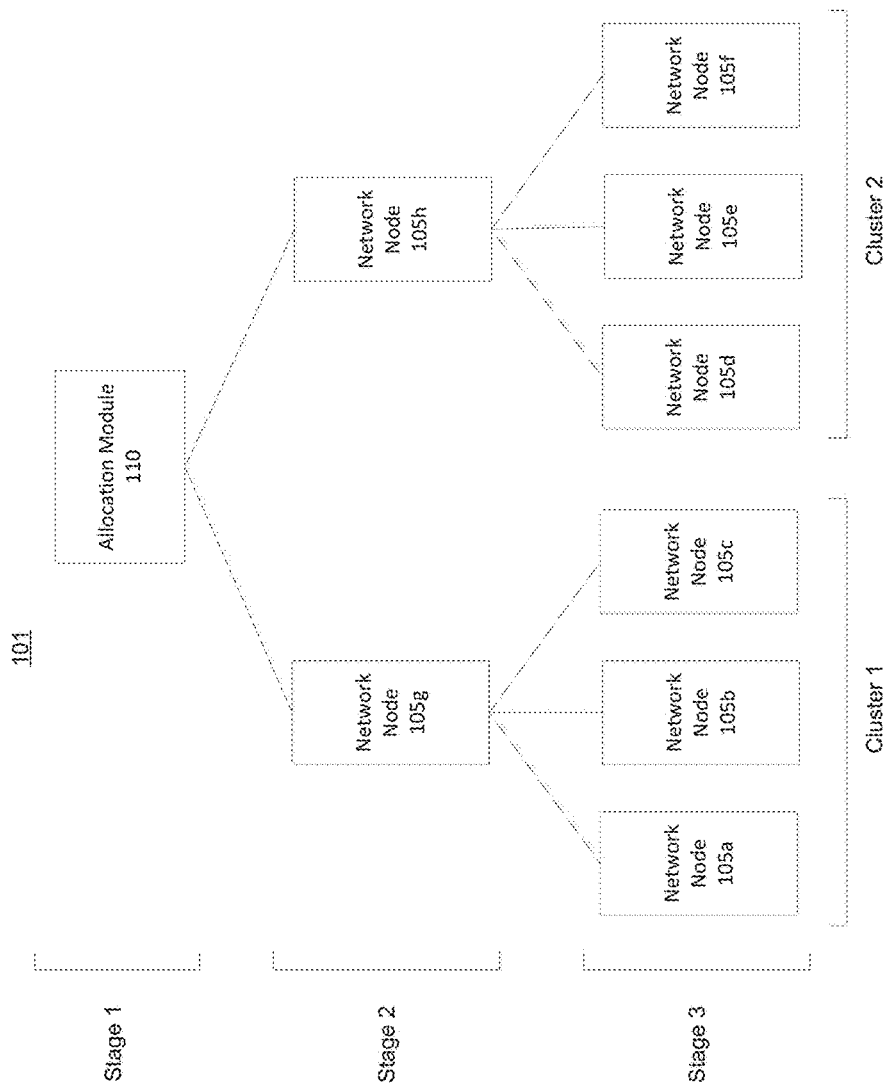

SYSTEMS AND METHODS FOR ACHIEVING HIGH NETWORK LINK UTILIZATION

BACKGROUND

Typically, attempting to increase network link utilization results in an increase in the number of network packets dropped by the network link. For many transmission protocols, congestion avoidance algorithms respond to the increase in dropped packets by slowing the network flow whose packets are dropped. As a result, maximum network link utilization is limited. In some instances, link utilization of greater than 85% can be very difficult to achieve. To increase efficiency of computer networks, it is desirable to achieve close to 100% link utilization.

SUMMARY OF THE INVENTION

Aspects and implementations of the present disclosure are directed to systems and methods for achieving high network link utilization.

At least one aspect is directed to an apparatus for achieving high utilization of a network link. The apparatus includes a node configured to transmit and receive network data. The apparatus includes a control module coupled to the node. The control module is configured to allocate a first percentage of available bandwidth of the node to the network flows of both the first and second types. The control module is configured to allocate the remaining bandwidth of the node, plus a second percentage of the available bandwidth of the node, to the network flows of the second type, so that the total bandwidth allocated to the network flows of the first type and the network flows of the second type exceeds the available bandwidth of the node. The network flows of the first type are transmitted according to a first protocol, and, as a result, are assigned a first quality of service. The network flows of the second type are transmitted according to a second protocol and, as a result, are assigned a second quality of service. The second quality of service is sufficiently higher than the first quality of service to ensure that network packets having the first quality of service substantially always receive priority over network flows having the second quality of service.

At least one aspect is directed to a method for achieving high utilization of a network link. The method includes obtaining a first communication protocol for transmitting network flows of a first type. The method includes assigning a first quality of service to the network flows of the first type. The method includes obtaining a second communication protocol for transmitting network flows of a second type. The method includes assigning a second quality of service, lower than the first quality of service, to the network flows of the second type. The second quality of service can be sufficiently lower than the first quality of service to ensure that network packets having the first quality of service substantially always receive priority over network packets having the second quality of service. The method includes allocating a first percentage of available bandwidth to the network flows of both the first and second types. The method includes allocating the remaining bandwidth, plus a second percentage of the available bandwidth, to the network flows of the second type, so that the total bandwidth allocated to the network flows of the first type and the network flows of the second type exceeds the available bandwidth of the network link.

At least one aspect is directed to computer-readable storage medium having instructions encoded thereon which, when executed by at least one processor, cause the processor to perform a method for achieving high utilization of a network link. The method includes obtaining a first communication protocol for transmitting network flows of a first type. The method includes assigning a first quality of service to the network flows of the first type. The method includes obtaining a second communication protocol for transmitting network flows of a second type. The method includes assigning a second quality of service, lower than the first quality of service, to the network flows of the second type. The second quality of service can be sufficiently lower than the first quality of service to ensure that network packets having the first quality of service substantially always receive priority over network packets having the second quality of service. The method includes allocating a first percentage of available bandwidth to the network flows of both the first and second types. The method includes allocating the remaining bandwidth, plus a second percentage of the available bandwidth, to the network flows of the second type, so that the total bandwidth allocated to the network flows of the first type and the network flows of the second type exceeds the available bandwidth of the network link.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIG. 1A is a block diagram of an example computer network, according to an illustrative implementation.

DESCRIPTION OF CERTAIN ILLUSTRATIVE IMPLEMENTATIONS

Figure 1B:
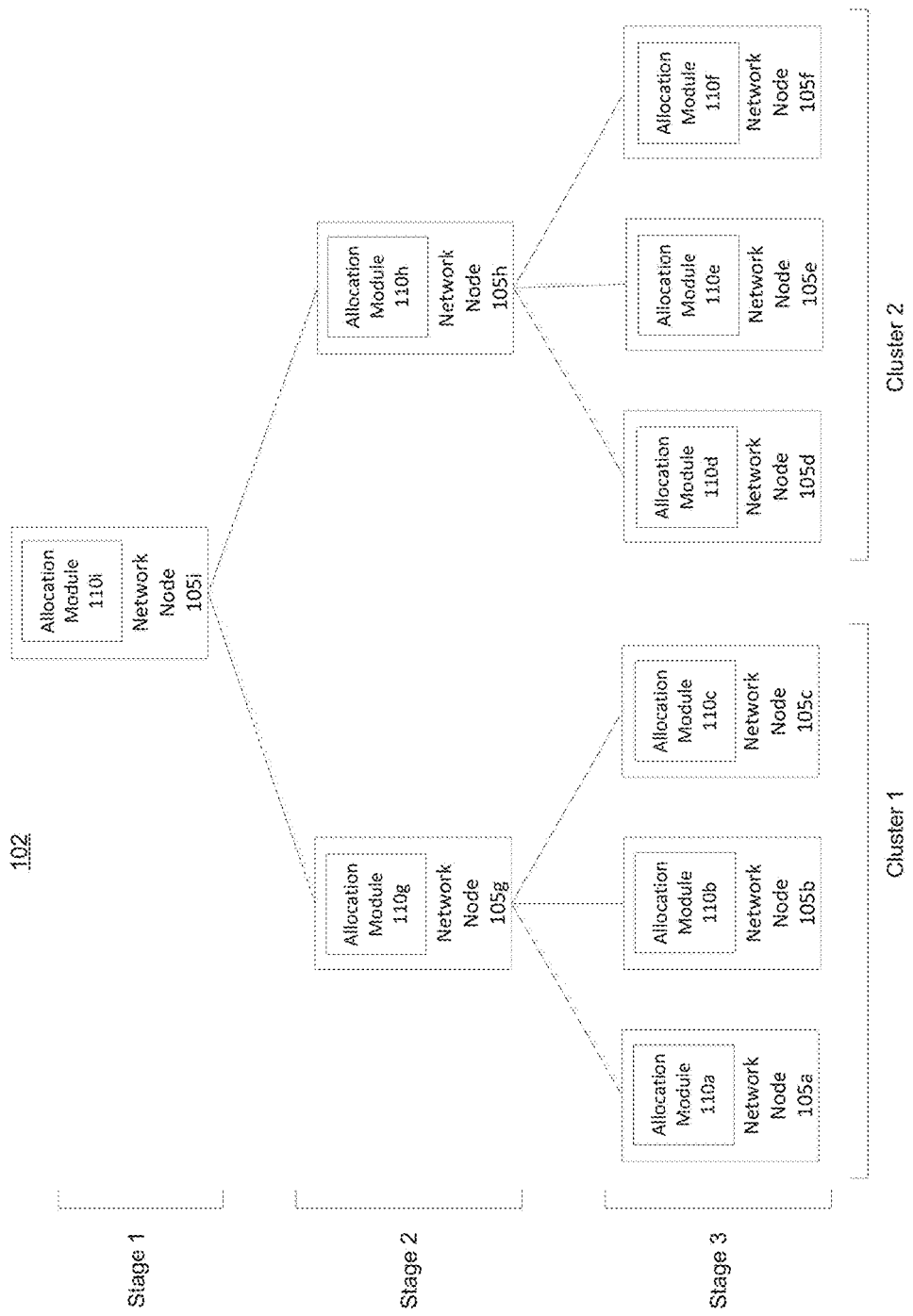
FIG. 1B is a block diagram of an alternative example computer network, according to an illustrative implementation.

Following below are more detailed descriptions of various concepts related to, and implementations of, systems and methods for achieving high utilization of a network link. The various concepts introduced above and discussed in greater detail below may be implemented in any of numerous ways, as the described concepts are not limited to any particular manner of implementation. Examples of specific implementations and applications are provided primarily for illustrative purposes.

FIG. 1A is a block diagram of a computer network 101, according to an illustrative implementation. The network 101 includes nodes 105a-105h (generally referred to as nodes 105) and an allocation module 110 arranged in a hierarchical fashion. For example, the allocation module 110 is positioned within a first stage of the network 101. The nodes 105 are arranged in a second stage and a third stage. The nodes 105a-105f in the third stage are further grouped into clusters. Cluster 1 includes nodes 105a-105c, while cluster 2 includes nodes 105d-105f. Lines in FIG. 1A joining the nodes 105 to one another and to the allocation module 110 represent communication links. The communication links can be optical links, wired electrical links, radio links, or any other form of physical layer connection.

Each cluster of nodes 105 in the third stage communicates with a respective node 105 in the second stage. Communication between nodes 105 in cluster 1 can be facilitated by the respective stage 2 node 105g, and communication between nodes 105 in cluster 2 can be facilitated by the stage 2 node 105h. The allocation module 110 can communicate with nodes 105 in the third stage via the nodes 105 in the second stage. The architecture of the network 101 is illustrative only, and may be modified in some implementations. For example, the network 101 may form part of a larger network that includes additional stages of nodes 105 or additional nodes 105 within each stage. In some implementations, the nodes 105 within a cluster may communicate directly with each other or with nodes 105 of a different cluster.

Each node 105 in the network 101 can generally include any type of device capable of communicating with other devices (e.g., other nodes 105) via the network 101. For example, each node 105 may be a computer, a router, a switch, a server, or any combination of these elements. Each node 105 includes at least one processor, a memory, and a network interface card coupled to the network 101. In some implementations, the network 101 represents a datacenter, and the nodes 105 represent servers within the data center. In other implementations, the network 101 represents a plurality of interconnected datacenters. For example, cluster 1 can represent a first datacenter and cluster 2 can represent a second datacenter. In general, datacenters may support a wide range of computer network traffic, including traffic associated with real-time content delivery, cloud computing services accessed by users of personal or mobile computers, data storage, data indexing, data backup, bulk data transfer, and data access.

In some implementations, the allocation module 110 can be implemented as special purpose logic circuitry, such as a field programmable gate array (FPGA) or an application-specific integrated circuit (ASIC). In other implementations, the allocation module 110 may be one or more general purpose processors configured to perform the processes disclosed herein by executing computer readable instructions stored on a computer readable medium. The allocation module 110 can also include a memory for storing the computer readable instructions, as well as communication hardware, such as a network interface card, allowing the allocation module 110 to communicate with the network nodes 105.

A network flow can include all of the data associated with one application that is to be transmitted between two nodes 105 in the network 101. Network flows in the network 101 can serve many different purposes, and each flow may have different requirements for transmission parameters such as packet loss, latency, and jitter. For example, network flows associated with real-time content delivery may have strict reliability requirements, resulting in low tolerance for packet loss and latency. Other network flows, such as flows associated with mass data backup or Internet index copy traffic may be less time sensitive, and may therefore tolerate higher levels of packet loss and high latency. The network 101 is configured to accommodate these various network flows.

The differing network flow requirements can cause inefficiency and disruption within the network 101. For example, attempting to increase data throughput within the network 101 can cause packet collisions, resulting in dropped or buffered packets. Some types of network flows, such as flows transmitted according to the transmission control protocol (TCP), implement collision avoidance algorithms which delay attempts to transmit packets when collisions occur. This in turn reduces the data throughput. As a result, the ability to increase bandwidth of the communication links can be limited. Other disruptions may also occur when attempting to increase data throughput. For example, packets having high loss and latency tolerance may in some instances be prioritized over packets with lower loss and latency tolerance. In such cases, a network may not serve users appropriately despite high bandwidth usage of the communication links.

The hierarchical structure of the network 101, including a central allocation module 110, can implement processes that help to mitigate these adverse effects while simultaneously increasing bandwidth of the communication links. In some implementations, the allocation module 110 can monitor network traffic and allocate bandwidth throughout the network 101. For example, the controller 100 can receive from each node 105 information corresponding to current bandwidth usage and the types of network flows each node 105 is sending and receiving. The allocation module 110 can use the information from each node 105 in the network 101 to determine bandwidth allocation targets, quality of service policies, and transmission protocols for various network flows, which can then be transmitted to the nodes 105. For example, a type of service header can be assigned for packets based on the characteristics and requirements of its associated network flow, and instructions regarding how to prioritize packets according to their type of service can be sent to each network node 105 by the allocation module 110. The network nodes 105 can then process packets in the network 101 more efficiently, increasing the utilization rate for each link in the network 101.

In some implementations, the allocation targets, quality of service policies, and transmission protocols can be modified over time. For example, the allocation module 110 can determine during a first time period that a relatively large proportion of the traffic in the network 101 includes network flows transmitted according to a protocol that has a high tolerance for packet loss and latency. The allocation module 110 can respond by controlling the network nodes 105 to allocate a larger percentage of available bandwidth to network flows transmitted according to this protocol. During a subsequent time period, the allocation module 110 may determine that the characteristics of the network traffic have changed. For example, a relatively large proportion of the network traffic during the subsequent time period may include network flows associated with real-time applications which do not tolerate packet loss and latency. The allocation module 110 can respond by controlling the network nodes to allocate a larger percentage of available bandwidth to the loss- and latency-sensitive network flows, while clamping network flows of other types in order to reduce packet collisions.

FIG. 1B is a block diagram of an alternative example computer network 102, according to an illustrative implementation. Like the network 101 shown in FIG. 1A, the network 102 includes network nodes 105a-105i arranged into clusters and stages in a hierarchical fashion. However, instead of a single allocation module 110 located in stage 1, each node 105a-105i in the network 102 includes a respective allocation module 110a-110i (referred to as allocation modules 110).

The allocation modules 110 allocate bandwidth for their respective network nodes 105. In some implementations, each allocation module 110 allocates bandwidth based on the types of network traffic processed by its respective node 105. For example, some of the nodes 105 may handle a a large percentage of network flows with strict reliability requirements, while others may primarily process network flows with higher tolerances for packet loss and latency. Because the allocation modules 110 are distributed throughout the network 102, bandwidth allocations at each node 105 can be varied to handle such an uneven distribution of different types of network flows in an efficient manner. In some implementations, the allocation modules 110 may communicate with a central controller or with each other to determine bandwidth allocations for their respective nodes 105.

Figure 2:
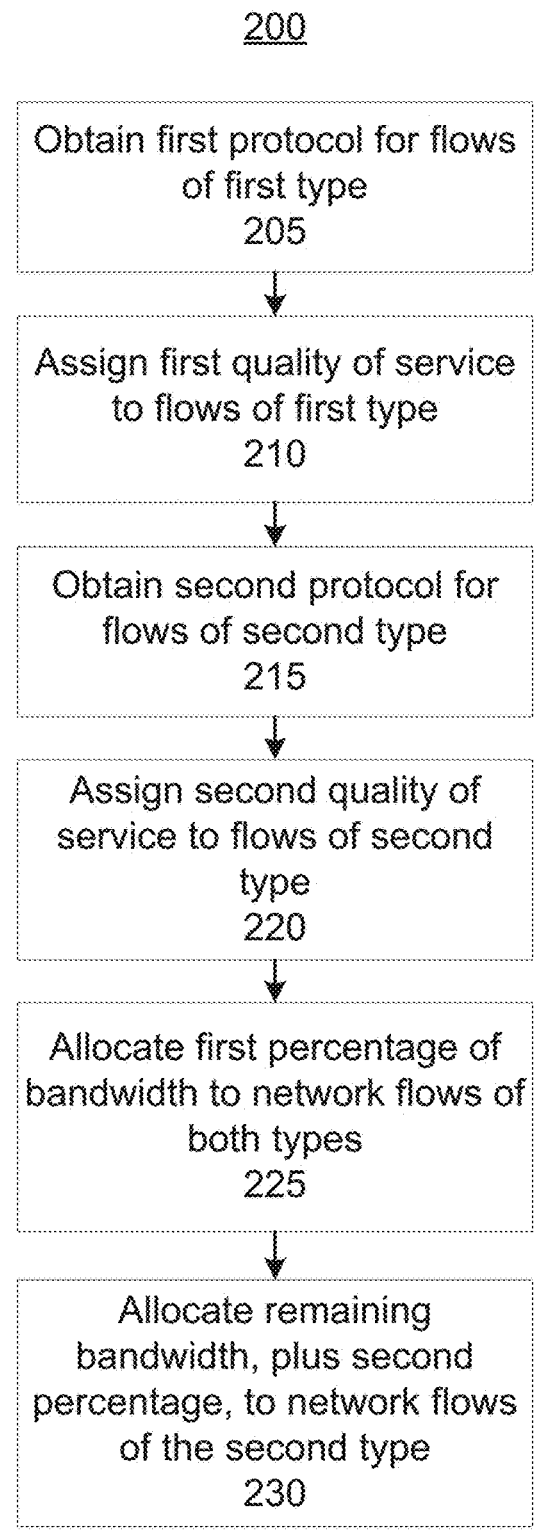
FIG. 2 is a flow diagram of a process for achieving high utilization of a network link, according to an illustrative implementation.

FIG. 2 is a flow diagram of a process 200 for achieving high utilization of a network link, according to an illustrative implementation. The process 200 includes obtaining a first protocol for flows of a first type (stage 205), assigning a first quality of service to flows of the first type (stage 210), obtaining a second protocol for flows of a second type (stage 215), assigning a second quality of service to flows of the second type (stage 220), allocating a first percentage of bandwidth to network flows of both types (stage 225), and allocating the remaining bandwidth, plus a second percentage, to network flows of the second type (stage 230). The steps of the process 200 can be carried out by the allocation module 110 and network nodes 105 shown in FIG. 1A, for example, to increase utilization of the communication links in the network 101.

The process 200 includes obtaining a first communication protocol for network flows of a first type (stage 205). In some implementations, the first network flow type may be identified based on its associated application. For example, a network flow may be categorized as being of the first type if its associated application requires reliable and/or real-time transmission of data. Network flows of the first type may therefore include network flows associated with streaming media, such as voice or video conferencing. Network flows of the first type may also include any other network flow requiring highly reliable transmission of network packets. For example, network flows of the first type can include Internet traffic or traffic associated with desktop virtualization.

The first communication protocol for network flows of the first type can therefore be selected to achieve the timing and reliability characteristics required by network flows of the first type. For example, the first protocol may be selected to include collision avoidance, error checking, acknowledgement, or sequence control algorithms, or any other features that can help to achieve the required transmission reliability of network flows of the first type. For example, a communication protocol such as TCP may be selected for network flows of the first type because TCP can provide reliable, error checked delivery of network packets. In other implementations, any other suitable protocol may be selected for network flows of the first type. For example, reliable user datagram protocol (RUDP) or datagram congestion control protocol (DCCP) may be selected for network flows of the first type.

The network node that originates a network flow may identify the flow as belonging to the first type and may select the appropriate first protocol. In some implementations, each network node may determine the type of flow and select an appropriate protocol based on a protocol selection policy. The protocol selection policy may be stored as computer executable instructions on a memory element associated with the network node. For example, a protocol selection policy can include a lookup table of applications, flow types, and communications protocols. The network node may determine the application associated with data to be transmitted over the network, and can refer to the lookup table to discover the flow type and communication protocol to be used to generate the corresponding network flow. In some implementations, the protocol selection policy may be dynamic. For example, the network node or another device, such as the allocation module 110 shown in FIG. 1A, may update the protocol selection policy in response to changing network traffic conditions. In some other implementations, the first protocol can be dictated by the application that generates or requests the network data to be transmitted. A network node processing the network data may therefore obtain an identification of the first protocol rather than select the first protocol.

The process 200 includes assigning a first quality of service to flows of the first type (stage 210). In implementations in which network flows of the first type require highly reliable transmission, the first quality of service may be selected to provide a higher priority to network flows of the first type, relative to other network traffic. The first quality of service may be assigned to a network flow by modifying header information of packets in the network flow to include an indication that the packets are to be transmitted with the first quality of service. For example, the "type of service" field of the packet header may contain this information. The network node from which the flow originates may modify the "type of service" value for each packet in network flows of the first type to include information indicating that the packets should be prioritized according to the first quality of service.

The process 200 includes obtaining a second communication protocol for network flows of a second type (stage 215). In some implementations, the second network flow type may be identified based on its associated application. For example, a network flow may be categorized as being of the second type if its associated application can tolerate relatively high latency or packet loss. Network flows of the second type may therefore include network flows associated with mass data backup, mass data transfer, or index copy traffic. Network flows of the second type may also include any other network flow requiring less reliable transmission than network flows of the first type, as discussed above.

The second communication protocol for network flows of the second type can therefore be selected to achieve high throughput without requiring strict deadline for delivery. The second protocol may therefore not include collision avoidance, error checking, acknowledgement, or sequence control algorithms, or that are required by network flows of the first type. For example, a communication protocol such as network block transfer (NetBLT) may be selected for network flows of the second type because NetBLT can provide high throughput over a variety of networks. In other implementations, any other suitable protocol, such as user datagram protocol (UDP) may be selected for network flows of the second type.

The network node that originates a network flow may identify the flow as belonging to the second type and may select the appropriate second protocol. In some implementations, each network node may determine the type of flow and select an appropriate protocol based on a protocol selection policy, as discussed above. In some other implementations, the second protocol can be dictated by the application that generates or requests the network data to be transmitted. A network node processing the network flow may therefore obtain an identification of the second protocol rather than select the first protocol The process 200 includes assigning a second quality of service to flows of the second type (stage 220). In implementations in which network flows of the second type are not required to be delivered at strict deadlines, the second quality of service may be selected to provide a lower priority to network flows of the second type, relative to other network traffic. The second quality of service may be assigned to a network flow by modifying header information of packets in the network flow to include an indication that the packets are to be transmitted with the second quality of service. For example, the "type of service" field of the packet header may contain this information. The network node from which the flow originates may modify the "type of service" value for each packet in network flows of the second type to include information indicating that the packets should be prioritized according to the second quality of service.

In some implementations, the second quality of service is selected to be significantly lower than the first quality of service. For example, the second quality of service can be sufficiently low that, if there is a collision between a packet having the first quality of service and a packet having the second quality of service, the packet having the second quality of service is dropped. In some implementations, the network nodes may implement a quality of service policy that ensures packets having the first quality of service are substantially always prioritized over packets having the second quality of service. In contrast, packets having the first (higher) quality of service can be transmitted with high priority and, when collisions occur, may have a shorter timeout period before retransmission is attempted. Network nodes can also maintain substantially larger queues associated with network packets having the first quality of service, so that the high priority packets can be stored in a queue and retransmitted at a later time if they are initially delayed due to collisions. Queues associated with network packets having the second quality of service may be substantially smaller. Therefore, when network traffic is substantially evenly divided between network packets having the first quality of service and network flows having the second quality of service, the network flows having the first quality of service are always prioritized over the network flows having the second quality of service. However, in some limited instances, a network packet having the second quality of service may receive priority over a network flow having the first quality of service. For example, if a network node processes a large burst of network packets having the first quality of service as well as a relatively small number of network packets having the second quality of service, the queue associated with the network packets having the first quality of service may overflow. As a result, some of the network packets having the second quality of service may be prioritized over some of the network packets having the first quality of service.

The process 200 includes allocating a first percentage of bandwidth of a communication link to network flows of both types (stage 225). The first percentage can be selected such that, in this first bandwidth allocation phase, a conservative portion of the bandwidth of the communication link is allocated. In some implementations, the first percentage is about equal to the maximum utilization percentage of the link when only network flows of the first type are transmitted. For example, network flows of the first type can have strict timing and reliability requirements that cause a network node to back off when collisions occur, resulting in a maximum link utilization significantly lower than 100%. In some implementations, the first percentage of bandwidth can be about 85%.

The first percentage of bandwidth can be allocated based on a bandwidth allocation policy. The bandwidth allocation policy may indicate the relative amounts of the first bandwidth percentage allocated to network flows of the first and second types. For example, the first percentage may be divided evenly between network flows of the first and second types, so that flows of each type receive an equal portion of the first percentage of bandwidth allocated in the first allocation phase. In other implementations, other allocation policies may be used. In some implementations, the bandwidth allocation policy may respond dynamically to changing conditions in the network. For example, a communication link may have three times as many network flows of the first type as network flows of the second type. The bandwidth allocation policy may therefore be selected to ensure that network flows of the first type receive three times as much bandwidth as network flows of the second type. In some implementations, the bandwidth allocation policy may change over time. For example, if the relative amounts of network flows of the first and second types vary over time, the bandwidth allocation policy may be updated over time accordingly. In some implementations, the bandwidth allocation policy may be determined by a controller such as the allocation module 110 shown in FIG. 1A.

The process 200 also includes allocating the remaining bandwidth of the communication link, plus an additional second percentage, to network flows of the second type only (stage 230). In some implementations, the second percentage is in the range of about 15% to about 30%. Therefore, after this second allocation phase, the communication link will be oversubscribed by an amount equal to the second percentage. Oversubscription virtually guarantees that some packets will be lost. However, packets are dropped according to their quality of service, so substantially all of the dropped packets will be packets from flows of the second type, having the second (lower) quality of service. These packets are transmitted using a protocol that tolerates high levels of packet loss and latency (e.g., NetBLT), and the dropped packets can simply be retransmitted at a later time with relatively few adverse consequences. Therefore, in steady state, the flows of the first type, which have a higher quality of service and strict timing requirements, are given priority. Bandwidth for these flows is allocated conservatively as discussed in connection with stage 225, to avoid packet loss. The remaining bandwidth is used by the flows of the second type, which have a higher tolerance for loss. The link is oversubscribed to achieve high link utilization while ensuring that network flows of the first type are still transmitted reliably. In some implementations, the process 200 allows a network link to achieve close to 100% utilization.

This bandwidth allocation technique of the process 200 can be efficient regardless of the relative numbers of network flows of the first type and the second type. For example, when the link is used entirely by flows of the first type (i.e., flows having a higher quality of service), a conservative portion (e.g., 85%) of the link is allocated to avoid failure due to congestion. When the link is used entirely by flows of the second type (i.e., flows having a lower quality of service), the link is oversubscribed to achieve very high bandwidth and the dropped packets do not have a large impact on network performance. In cases when the link is shared by flows of both types, priority is given to the flows of the first type requiring high reliability, while high bandwidth is achieved by oversubscribing the remaining bandwidth to the flows of the second type, which tolerate high levels of loss and latency.

Figure 3A:
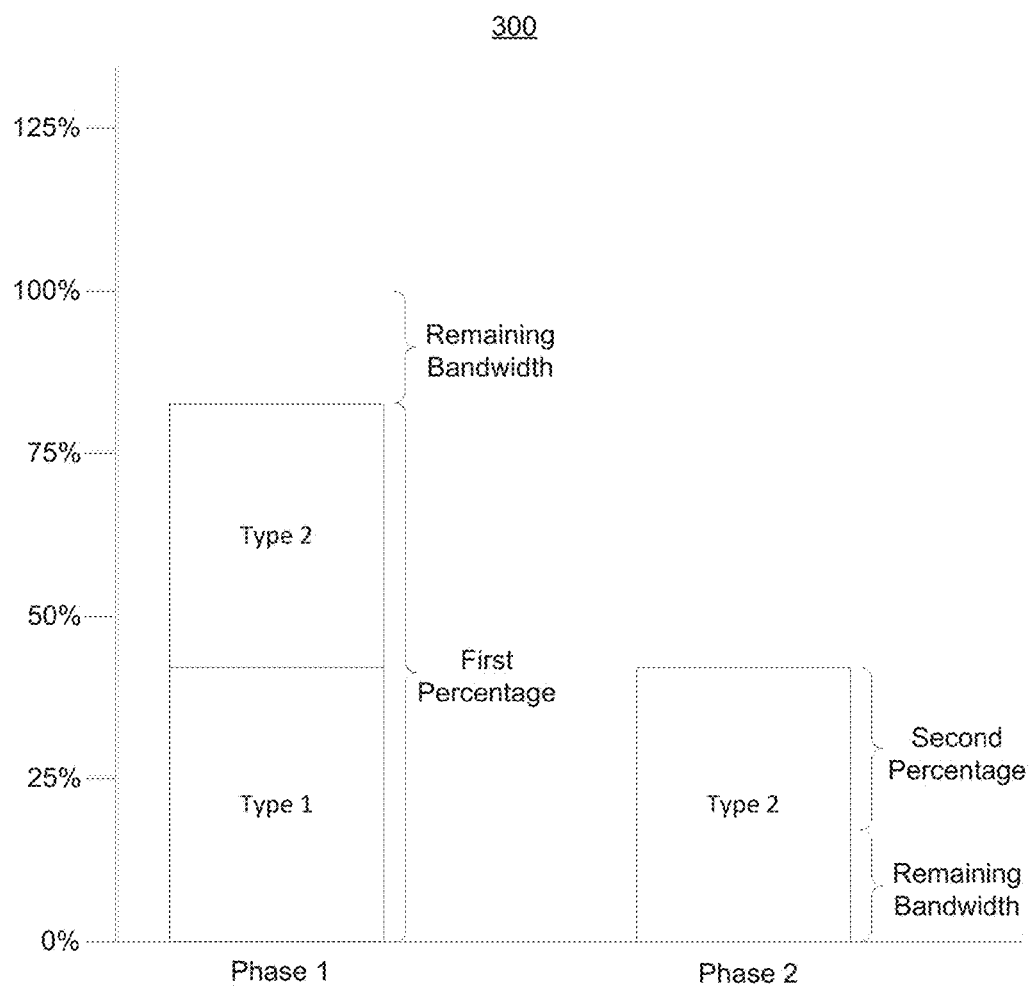
FIGS. 3A and 3B are graphs showing bandwidth allocation of a network link handling two types of network flows, according to the process shown in FIG. 2.
Figure 3B:
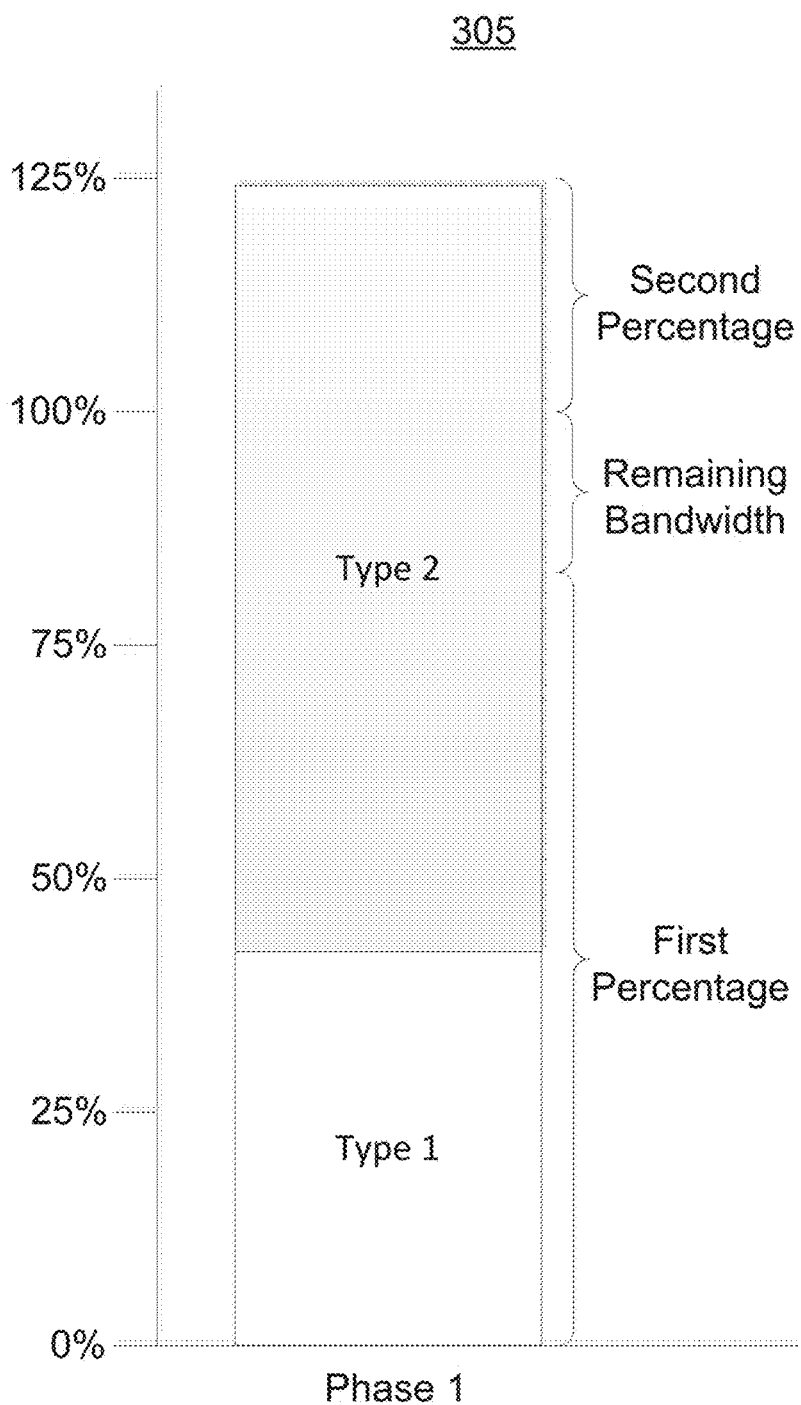
Figure 4A:
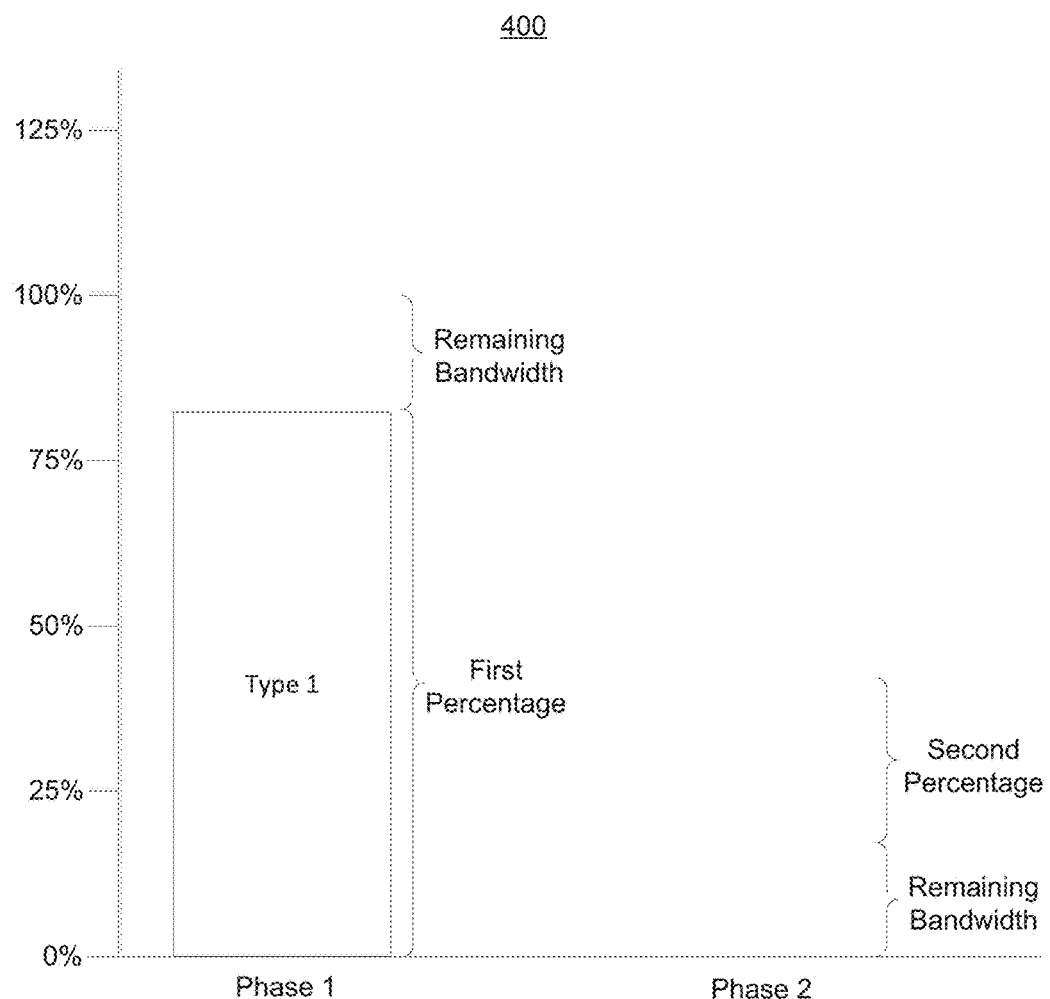
FIGS. 4A and 4B are graphs showing bandwidth allocation of a network link handling only a first type of network flow, according to the process shown in FIG. 2.
Figure 4B:
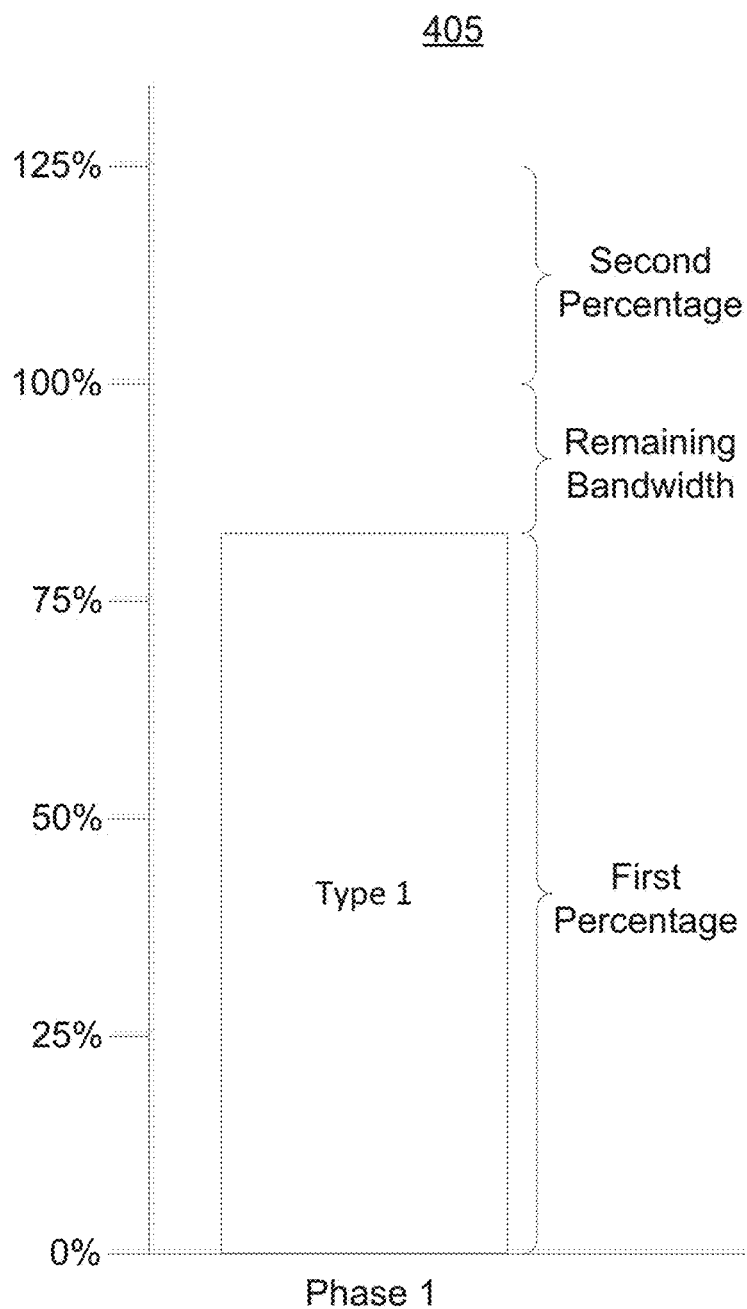
Figure 5A:
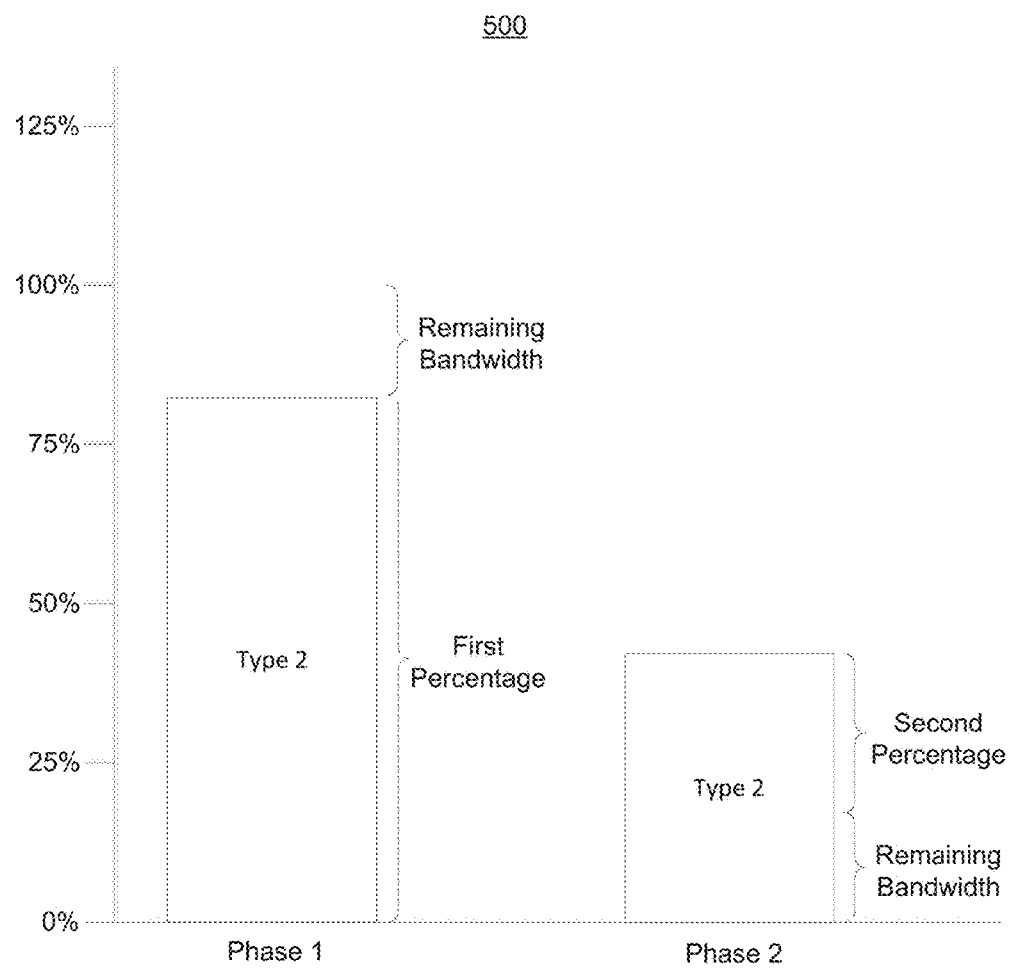
FIGS. 5A and 5B are graphs showing bandwidth allocation of a network link handling only a second type of network flow, according to the process shown in FIG. 2.
Figure 5B:
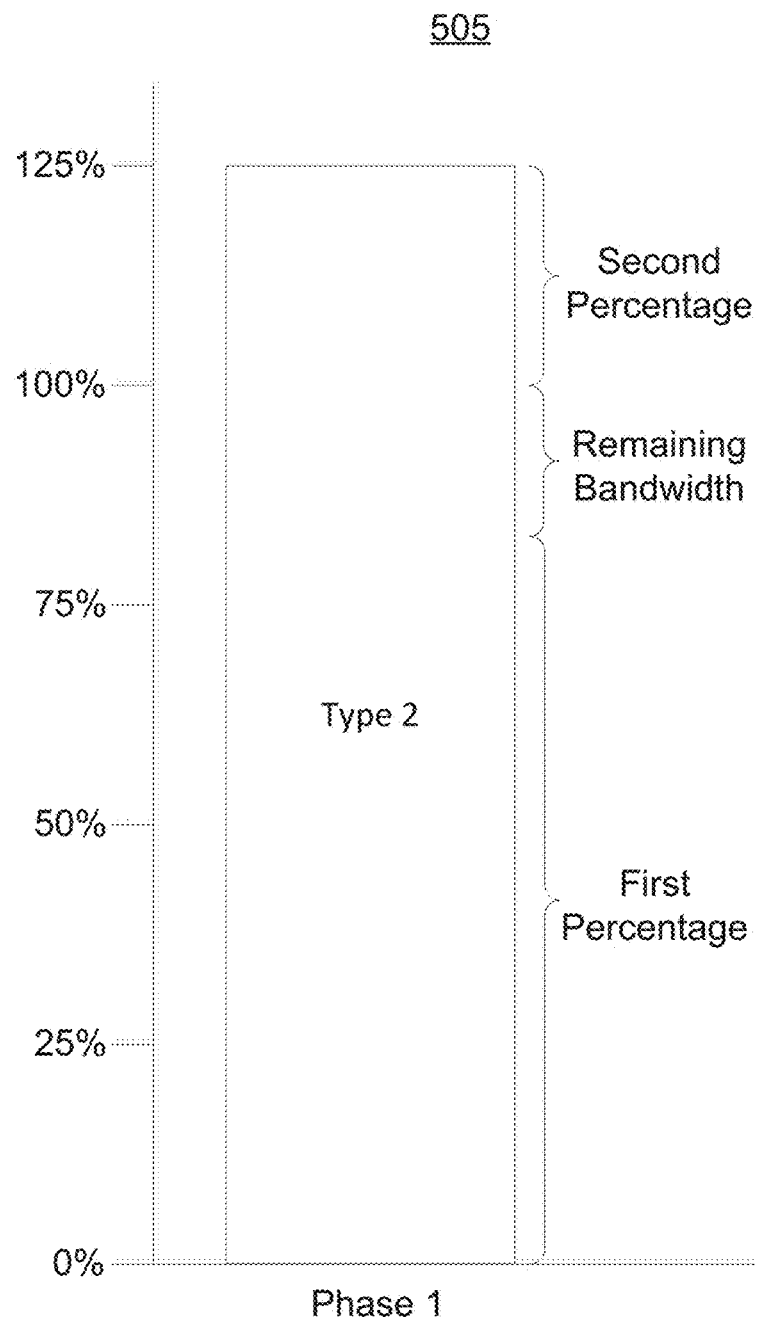

FIGS. 3A-3B, 4A-4B, and 5A-5B are graphs showing bandwidth allocation of a network link, according to an illustrative implementation. The graphs show how bandwidth is allocated in the two phases discussed above in connection with FIG. 2 (i.e., stages 225 and 230 of the process 200), as well as the total bandwidth allocation. FIGS. 3A and 3B illustrate bandwidth allocation for a communication link carrying flows of both types. FIGS. 4A and 4B illustrate bandwidth allocation for a communication link carrying flows of the first type only (i.e., flows having strict timing requirements and a high quality of service). FIGS. 5A and 5B illustrate bandwidth allocation for a communication link carrying flows of the second type only (i.e., flows having less strict timing requirements and a lower quality of service).

FIG. 3A shows a graph 300 illustrating the bandwidth allocation of a communication link handling network flows of the first type and network flows of the second type, according to the two phase allocation process described above in connection with FIG. 2. The two phases are shown along the x-axis. The percentage of available bandwidth allocated in each phase is represented by the y-axis.

As shown, in phase 1, a first percentage of the available bandwidth is allocated to network flows of both types. In the graph 300, the first percentage is evenly divided between network flows of the first and second type. However, it should be noted that this even division is illustrative only. In other implementations, the first percentage may be divided unequally between flows of the first and second types. The relative division of the first percentage may be based on a bandwidth allocation policy determined by a controller, such as the allocation module 110 shown in FIG. 1A. Similarly, although the first percentage is shown in the graph 300 as approximately 85%, the first percentage may vary in different implementations. For example, the first percentage may be about 50%, about 60%, about 70%, about 80%, or about 90% of the total available bandwidth. The remaining (unallocated) bandwidth is also shown as the difference between the total bandwidth of the communication link (i.e., 100%) and the first percentage allocated in phase 1.

In phase 2, the remaining bandwidth, plus an additional second percentage, is allocated only to network flows of the second type. The second percentage is included to ensure that the link is oversubscribed when network flows of the second type are available. In some implementations, the second percentage is in the range of about 15% to about 30%, for a total allocation of about 115% to about 130% of the available bandwidth.

FIG. 3B shows a graph 305 illustrating the final bandwidth allocation of the communication link. The final allocation shown in the graph 305 is the sum of the allocations in phase 1 and phase 2 of the graph 300. The final allocation includes the bandwidth allocated to flows of the first and second types in the first phase, plus the bandwidth allocated to flows of the second type in the second phase. As a result, the total allocation is about 125%, meaning that the communication link is oversubscribed. As discussed above, the packets dropped as a result of the oversubscription will be packets of the second type, which have a lower quality of service than packets of the first type. Packets of the second type have a higher tolerance for loss and less strict timing requirements, so the dropped packets will not have a significant impact on the performance of their associated applications. The oversubscription of the communication link increases the actual utilization of the communication link.

FIG. 4A shows a graph 400 illustrating the bandwidth allocation of a communication link handling network flows of the first type only, according to the two phase allocation process described above in connection with FIG. 2. The two phases are shown along the x-axis. The percentage of available bandwidth allocated in each phase is represented by the y-axis.

As shown, in phase 1, a first percentage of the available bandwidth is allocated entirely to network flows of the first type. While the bandwidth allocation policy may allow for the first percentage to be divided between flows of the first type and flows of the second type, the absence of flows of the second type allows all of the first percentage of bandwidth to be allocated to flows of the first type. The remaining bandwidth is also shown as the difference between the total bandwidth of the communication link (i.e., 100%) and the first percentage allocated in phase 1.

In phase 2, the remaining bandwidth, plus an additional second percentage, is allocated only to network flows of the second type. Because there are no flows of the second type in this example, no bandwidth is allocated in phase 2.

FIG. 4B shows a graph 405 illustrating the final bandwidth allocation of the communication link after the bandwidth is allocated in phase 1 and phase 2, as shown in FIG. 4A. The final allocation shown in the graph 405 is the sum of the allocations in phase 1 and phase 2 of the graph 400. As no bandwidth was allocated in phase 2, the total bandwidth allocation is equal to bandwidth allocated in phase 1. The bandwidth of the link is therefore allocated at less than 100%, which allows the flows of the first type to be reliably transmitted with a high quality of service. This conservative bandwidth allocation reduces instances of dropped packets, which is required for the network flows of the first type.

FIG. 5A shows a graph 500 illustrating the bandwidth allocation of a communication link handling network flows of the second type only, according to the two phase allocation process described above in connection with FIG. 2. The two phases are shown along the x-axis. The percentage of available bandwidth allocated in each phase is represented by the y-axis.

As shown, in phase 1, a first percentage of the available bandwidth is allocated entirely to network flows of the second type. While the bandwidth allocation policy may allow for the first percentage to be divided between flows of the first type and flows of the second type, the absence of flows of the first type allows all of the first percentage of bandwidth to be allocated to flows of the second type. The remaining bandwidth is also shown as the difference between the total bandwidth of the communication link (i.e., 100%) and the first percentage allocated in phase 1.

In phase 2, the remaining bandwidth, plus an additional second percentage, is allocated only to network flows of the second type. The second percentage is included to ensure that the link is oversubscribed when network flows of the second type are available. In some implementations, the second percentage is in the range of about 15% to about 30%.

FIG. 5B shows a graph 505 illustrating the final bandwidth allocation of the communication link after bandwidth is allocated in phase 1 and phase 2, as shown in the graph 500. The final allocation shown in the graph 505 is the sum of the allocations in phase 1 and phase 2 of the graph 500. The final allocation includes the bandwidth allocated to flows of the second type in the first phase, plus the bandwidth allocated to flows of the second type in the second phase. In this example, there are no network flows of the first type to allocate. As a result, all of the bandwidth is allocated to flows of the second type and the total allocation is about 125%, meaning that the communication link is oversubscribed by 25%. As discussed above, the packets dropped as a result of the oversubscription will be packets of the second type, which have a lower quality of service than packets of the first type. Packets of the second type have a higher tolerance for loss and less strict timing requirements, so the dropped packets will not have a significant impact on the performance of their associated applications. The oversubscription of the communication link increases the actual utilization of the communication link.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for achieving high utilization of a network link, comprising:
   a node configured to transmit and receive network data over a link that has a total bandwidth; and
   a controller coupled to the node, the controller configured to perform a bandwidth allocation process to achieve greater than 85% utilization of the network link by:
      allocating a first percentage of an available bandwidth of the network link at the node to network flows of both a first type and a second type;
      after allocating the first percentage, allocating a complete remaining bandwidth of the link at the node, plus a second percentage of the total bandwidth of the link at the node, to the network flows of the second type, such that a total bandwidth allocated to the network flows of the first type and the network flows of the second type over the link at the node exceeds the total bandwidth of the link at the node by the second percentage, wherein the second percentage is in a range of about 15%-30% of the total bandwidth of the link at the node, and
      controlling the node to apply the bandwidth allocations to the network flows of the first and second types, wherein:
         the network flows of the first type are transmitted according to a first protocol and, as a result, are assigned a first quality of service,
         the network flows of the second type are transmitted according to a second protocol and, as a result, are assigned a second quality of service, and
         the second quality of service is sufficiently lower than the first quality of service to ensure that network packets having the first quality of service substantially always receive priority over network packets having the second quality of service.

2. The apparatus of claim 1, wherein the network flows of the second type are transmitted using a protocol having a higher tolerance for at least one of packet loss, latency, and jitter than the protocol used to transmit network flows of the first type.

3. The apparatus of claim 1, wherein the network flows of the second type include network packets associated with one of mass data backup, mass data transfer, and index copy.

4. The apparatus of claim 1, wherein the controller is further configured to select transmission control protocol (TCP) for the first communication protocol.

5. The apparatus of claim 1, wherein the controller is further configured to select network block transfer (NETBLT) for the second communication protocol.

6. The apparatus of claim 1, wherein the node comprises a network switch.

7. The apparatus of claim 1, wherein the controller includes a processor remote from the node.

8. A method for achieving high utilization of a network link having a total bandwidth, the method comprising:
   obtaining a first communication protocol for transmitting network flows of a first type;
   assigning a first quality of service to the network flows of the first type;
   obtaining a second communication protocol for transmitting network flows of a second type;
   assigning a second quality of service, lower than the first quality of service, to the network flows of the second type, wherein the second quality of service is sufficiently lower than the first quality of service to ensure that network packets having the first quality of service substantially always receive priority over network packets having the second quality of service;
   performing a bandwidth allocation process to achieve greater than 85% utilization of the network link by:
      allocating a first percentage of an available bandwidth of the network link to the network flows of both the first and second types, and
      after allocating the first percentage, allocating a complete remaining bandwidth of the network link, plus a second percentage of the total bandwidth of the network link, to the network flows of the second type, such that a total bandwidth allocated to the network flows of the first type and the network flows of the second type over the network link exceeds the total bandwidth of the network link by the second percentage, wherein the second percentage is in a range of about 15%-30%; and
   controlling a network node configured to transmit and receive network data over the network link, to apply the bandwidth allocations to the network flows of the first and second types.

9. The method of claim 8, wherein the network flows of the second type are transmitted using a protocol having a higher tolerance for at least one of packet loss, latency, and jitter than the protocol used to transmit network flows of the first type.

10. The method of claim 8, wherein the network flows of the second type include network packets associated with one of mass data backup, mass data transfer, and index copy.

11. The method of claim 8, wherein the first communication protocol is transmission control protocol (TCP).

12. The method of claim 8, wherein the second communication protocol is network block transfer (NETBLT).

13. A non-transitory computer-readable storage medium having instructions encoded thereon which, when executed by at least one processor, cause the processor to perform a method for achieving high utilization of a network link having a total bandwidth, the method comprising:
   obtaining a first communication protocol for transmitting network flows of a first type;
   assigning a first quality of service to the network flows of the first type;
   obtaining a second communication protocol for transmitting network flows of a second type;
   assigning a second quality of service, lower than the first quality of service, to the network flows of the second type, wherein the second quality of service is sufficiently lower than the first quality of service to ensure that network packets having the first quality of service substantially always receive priority over network packets having the second quality of service;
   performing a bandwidth allocation process to achieve greater than 85% utilization of the network link by:
      allocating a first percentage of an available bandwidth of the network link to the network flows of both the first and second types, and
      after allocating the first percentage, allocating a complete remaining bandwidth of the network link, plus a second percentage of the total bandwidth of the network link, to the network flows of the second type, such that a total bandwidth allocated to the network flows of the first type and the network flows of the second type over the network link exceeds the total bandwidth of the network link by the second percentage, wherein the second percentage is in a range of about 15%-30%; and controlling a network node configured to transmit and receive network data over the network link, to apply the bandwidth allocations to the network flows of the first and second types.

14. The non-transitory computer-readable storage medium of claim 13, wherein the method further comprises identifying the network flows of the second type based on their higher tolerance for at least one of packet loss, latency, and jitter relative to network flows of the first type.

15. The non-transitory computer-readable storage medium of claim 13, wherein the network flows of the second type include network packets associated with one of mass data backup, mass data transfer, and index copy.

16. The non-transitory computer-readable storage medium of claim 13, wherein the method further comprises selecting transmission control protocol (TCP) for the first communication protocol.

17. The non-transitory computer-readable storage medium of claim 13, wherein the method further comprises selecting network block transfer (NETBLT) for the second communication protocol.

* * * * *